United States Patent [19]

Matthews et al.

[11] Patent Number: 4,788,386

[45] Date of Patent: Nov. 29, 1988

[54] MENU FOR A CHARGE RATIO DIGITIZER

[75] Inventors: Henry G. Matthews, Haddam; Thomas Zalenski, Killingworth; Jamie L. Barbetti, Milford; Al Mletzko, Woodbury, all of Conn.

[73] Assignee: Summagraphics Corporation, Fairfield, Conn.

[21] Appl. No.: 28,495

[22] Filed: Mar. 20, 1987

[51] Int. Cl.[4] .............................................. G08C 21/00
[52] U.S. Cl. ...................................................... 178/19
[58] Field of Search ................................... 178/18, 19

[56] References Cited

U.S. PATENT DOCUMENTS 4,677,258  6/1987  Kawashima et al. ................. 178/18

*Primary Examiner*—Stafford D. Schreyer
*Attorney, Agent, or Firm*—Rosen, Dainow & Jacobs

[57] ABSTRACT

A charge ratio tablet having three patterned electrodes for determining the position coordinates of a stylus relative to a first area on the tablet is provided with a menu in a second area. The menu includes first and second pluralities of menu electrodes, the three menu electrodes of the first pluralilty having a first geometric pattern and the three menu electrodes of the second pluralilty having a second geometric pattern. The patterned electrodes and menu electrodes are driven in accordance with a predetermined sequence. The processing circuitry determines the position coordinates of the stylus if the signal induced in the stylus in response to driving of the three patterned electrodes simultaneously has at least a predetermined magnitude. The processing circuitry carries out operations other than position coordinate determination if instead the stylus is capacitively coupled to a driven menu electrode. The processing circuitry discriminates which menu electrode is capacitively coupled to the stylus.

25 Claims, 11 Drawing Sheets

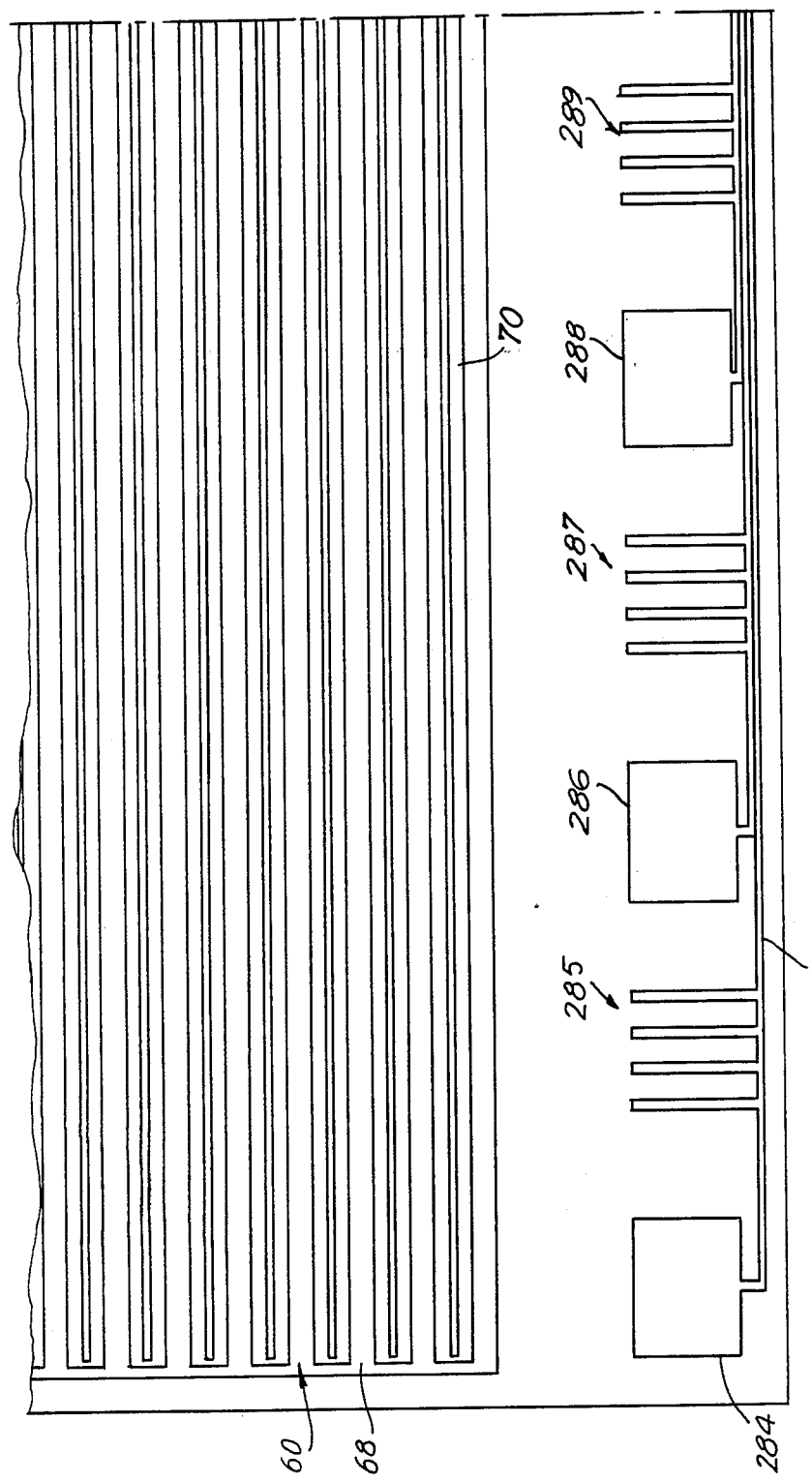

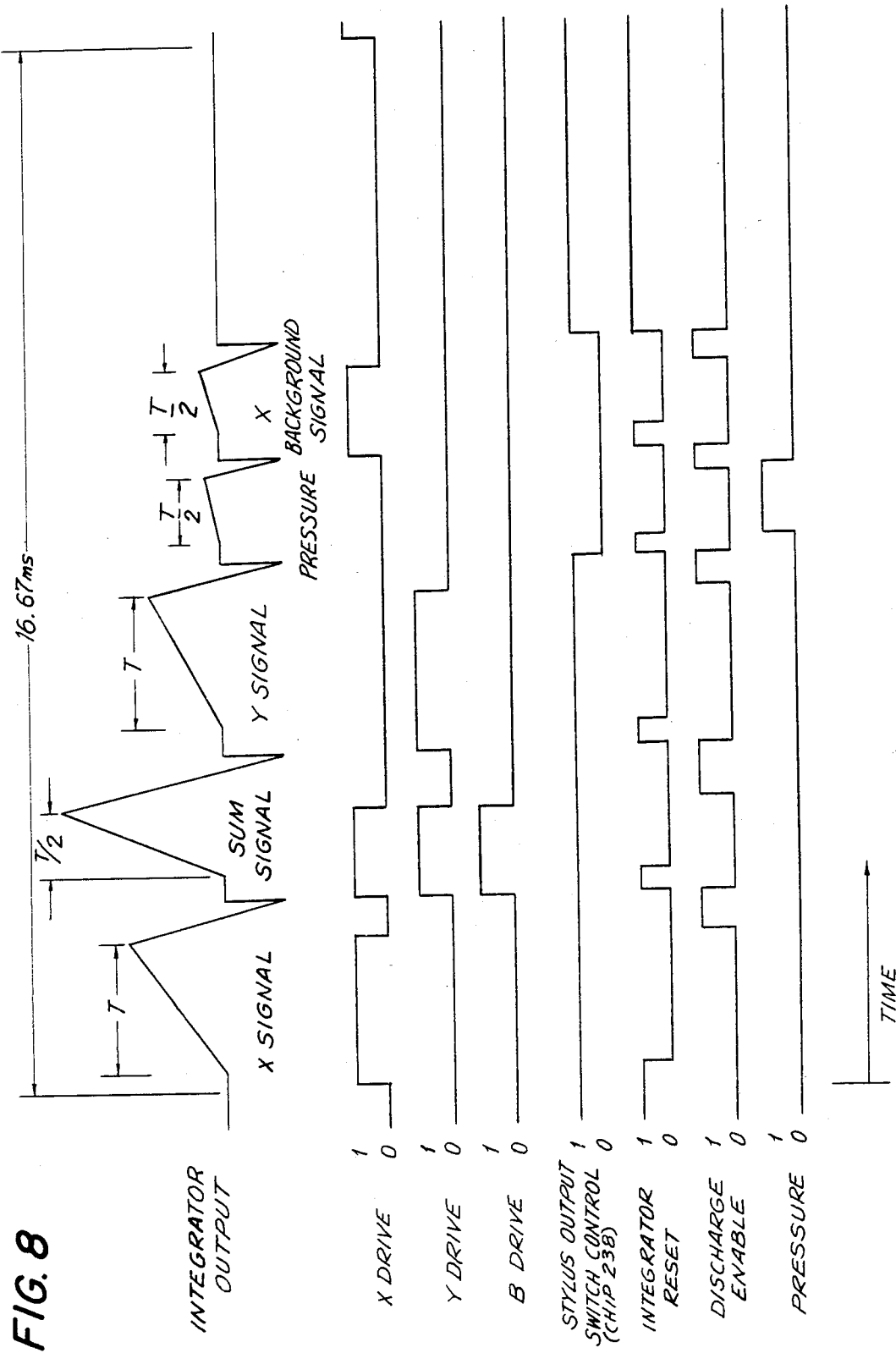

MENU FOR A CHARGE RATIO DIGITIZER

FIELD OF THE INVENTION

This invention relates to a circuit arrangement for incorporating a menu comprising a plurality of menu electrodes in a charge ratio digitizer tablet of a type wherein communication between a patterned electrode layer and a movable stylus is established by capacitive coupling between the patterned layer and the stylus. The menu electrodes are in addition to the electrodes of the active coordinate determination area and serve to enable selection of functions, modes or the like. The function or mode selected depends on which menu electrode the stylus is capacitively coupled to during driving of the menu electrodes in accordance with a predetermined cycle.

BACKGROUND OF THE INVENTION

A digitizer of simple construction is of the wedge and strip type. A digitizer of this type comprises a digitizing tablet and cursor or stylus movable thereon, wherein an electrical field coupling is utilized to ascertain the position of the cursor or stylus on the digitizer tablet. The coordinate system is typically the x-y coordinate system.

The cursor or stylus comprises a housing movable on the digitizer tablet, the housing containing a coupling electrode. In one embodiment an input signal is applied to the coupling electrode of the cursor or stylus. The coupling electrode field electrically couples to wedge (sawtooth) and strip patterned electrodes embedded in the digitizer tablet. One of the wedge or strip patterned electrodes is used to ascertain the x-axis position of the cursor and the other is used to ascertain the y-axis position of the cursor. The wedge and strip patterned electrodes are conveniently provided in a coplanar arrangement on a printed circuit board and covered with a layer of dielectric material to provide a smooth tablet surface. In the embodiments where the coupling electrode of the cursor or stylus is driven, the signals induced in the patterned electrodes are processed electronically to ascertain the position of the cursor relative to the tablet.

In accordance with the wedge-and-strip type of digitizer, disclosed in U.S. Pat. No. 4,705,919, assigned to the assignee of the present application and the disclosure of which is specifically incorporated herein by reference, the coupling electrode outputs the induced signal and the patterned electrodes are driven. The digitizer tablet has three patterned electrodes which produce an x-axis (X) signal, a y-axis (Y) signal and a balance (B) signal. The X electrode comprises a plurality of conductive rectangular strips disposed vertically and arranged at equal intervals and in order of increasing width from one side to the other side of the tablet, e.g., increasing in width from the left to the right side of the tablet. The Y electrode comprises a plurality of uniform conductive wedges or sawtooths also disposed vertically and arranged at equal intervals with the Y wedges interleaved with the X strips. Movement of the cursor in the x-axis direction has a negligible effect on the cursor coupling with the Y electrode and movement of the cursor in the y-axis direction has a negligible effect on the cursor coupling with the X electrode. The balance (hereinafter "B") electrode substantially covers the area of th digitizer tablet not covered by the X and Y electrodes, except for interelectrode spacing therebetween.

The coupling electrode located in the cursor housing and movable on the surface of the digitizing tablet surface is connected to an oscillator whose frequency typically is in the range of 10 kHz to 1 MHz. The coupling electrode induces electrical signals in the X, Y and B electrodes.

The surface area of the X electrode coupled with the coupling electrode increases as the cursor or stylus is moved or positioned toward the one side of the tablet where the strips are wider, and hence more electrical signal is induced in the X electrode. Similarly, the surface area of the Y electrode coupled with the coupling electrode increases as the cursor or stylus is moved to a region on the tablet where the wedges are wider, and hence more electrical signal is induced in the Y electrode. The X, Y and B electrodes completely cover the position coordinate determination area of the tablet except for narrow spacing between the electrodes. It is therefore expected that the sum of the signals on the X, Y and B electrodes will be substantially independent of cursor (stylus) position. This sum signal depends primarily upon the amplitude of the oscillator signal, the proximity of the coupling electrode to the X, Y and B electrodes, and the dielectric constant of the material between the coupling electrode and the X, Y and B electrodes.

Based upon principles of mathematics and electronics, the x coordinate of the cursor is proportional to the X electrode signal divided by the sum of the X, Y, and B electrode signals. Similarly the y coordinate of the cursor is expected to be proportional to the Y electrode signal divided by the sum of the X, Y and B electrode signals. In theory, this ratiometric technique should enable accurate measurement of the cursor (stylus) position and be independent of the proximity of the cursor (stylus) to the digitizer tablet and the dielectric therebetween.

Alternatively, the functions of the coupling electrode and the patterned electrodes can be reversed, i.e. input signals are successively applied to the X, Y and B electrodes, and induced signals are outputed from the coupling electrode in response thereto.

In the preferred embodiment of the tablet disclosed in U.S. Pat. No. 4,705,919, a coupling electrode located in a cursor housing and movable over the surface of the digitizer tablet is coupled to one or more of the X, Y and B electrodes, which are driven in accordance with a predetermined pattern. Alternatively, the coupling electrode can be incorporated in a stylus. (Hereinafter the term "cursor" will be generally used with the understanding a stylus can be used in place of a cursor in the invention.) The signals capacitively induced in the coupling electrode are outputed to the processing circuitry, which determines the coordinate position of a point on the cursor therefrom with compensation for resolution distortion.

The surface area of the X electrode coupled with the cursor increases as the cursor is moved or positioned toward one side of the tablet where the strips are wider and accordingly when the X electrode is driven, the amount of electrical signal coupled to the cursor increases as the cursor moves in the direction of increasing strip width of the X electrode. Similarly, the surface area of the Y electrode coupled with the cursor increases as the cursor is moved to a region of the tablet where the wedges are wider, and accordingly when the Y electrode is driven, the amount of electrical signal coupled to the cursor increases as the cursor moves in the direction of increasing wedge width of the Y electrode.

Three separate driving circuits respectively apply square wave signals to the X, Y and B electrodes and coupling of these signals to the coupling electrode of the cursor is sampled in accordance with a predetermined sampling cycle. Each output signal is amplified, rectified, integrated and digitized to produce a digital signal representing the amount of capacitive coupling induced in the cursor by the one or more driven electrodes. A microprocessor performs mathematical operations on the digital signals in accordance with mathematical relationships for wedge and strip configurations to produce data $X_{in}$ and $Y_{in}$ representative of the x and y coordinates of the cursor position on the digitizer surface. In particular, $$X_{in} = 2C_X/(C_X + C_Y + C_B) \quad (1)$$

$$Y_{in} = 2C_Y/(C_X + C_Y + C_B) \quad (2)$$

where $C_X$ is the digital value corresponding to the signal induced in the X electrode, $C_Y$ is the digital value corresponding to the signal induced in the Y electrode and $C_B$ is the digitial value corresponding to the signal induced in the balance electrode. The geometry of the patterned electrodes is such that $0 < X_{in} < 1$ and $0 < Y_{in} < 1$. The digital value representing signal output from the cursor or stylus when the X, Y and B electrodes are driven simultaneously, i.e. $C_X + C_Y + C_B$, will hereinafter be referred to as $C_{sum}$.

The $C_X$, $C_Y$ and $C_{sum}$ values are obtained by adjusting the raw readings to compensate for the noise and the offset, as fully disclosed in U.S. patent application Ser. No. 28,499, assigned to the assignee of the present application and entitled METHOD AND APPARATUS FOR CALIBRATION OF A CHARGE RATIO DIGITIZER, in accordance with the following equations:

$$C_X = A_X - B_X \quad (3)$$

$$C_Y = A_Y - B_Y \quad (4)$$

$$C_{sum} = A_{sum} - B_{sum} \quad (5)$$

where $A_X$, $A_Y$ and $A_{sum}$ are respectively the digital values (i.e. raw readings) obtained in response to driving of the X electrode alone, the Y electrode alone and the X, Y and B electrodes together when the stylus or cursor is enabled, and $B_X$, $B_Y$ and $B_{sum}$ are respectively the digital values (i.e. background readings) obtained in response to driving of the X electrode alone, the Y electrode alone and the X, Y and B electrodes together when the stylus or cursor is disabled.

To compensate for the noise and the offset, a digitizer construction is provided wherein readings $B_X$, $B_Y$ and $B_{sum}$ are taken when the stylus or cursor is disabled. Each background reading is the sum of the digital value corresponding to the environmental and inherent noise and the digital value corresponding to the offset. This summed background digital value is stored in memory and subsequently subtracted from the readings acquired during digitization, i.e. when the stylus or cursor is enabled.

The microprocessor also operates upon the acquired data using correction factors to compensate for resolution distortion. Because of the inherent distortions discussed above, the x and y coordinates cannot be determined simple from the values $2C_X/C_{sum}$ and $2C_Y/C_{sum}$. The x and y coordinates can be determined only after a calibration has been performed to compensate for resolution distortion. This calibration is performed by processing the signal output from a small conductive plate, i.e. the so-called "phantom cursor" built into the digitizer tablet.

The patterned electrodes of the prior art charge ratio tablet form an active surface area useable to determine the positional coordinates of a stylus or cursor coupled to the tablet. However, this prior art tablet is disadvantageous in that no menu means are incorporated in the tablet for enabling function or mode selection using the cursor or stylus.

SUMMARY OF THE INVENTION

It is an object of the invention to overcome the aforementioned disadvantage of the prior art charge ratio tablet by incorporating a menu for selecting functions or modes.

It is a further object of the invention to provide a charge ratio tablet having a plurality of patterned electrodes for determining the positional coordinates of the cursor or stylus when the cursor or stylus is in proximity with the patterned electrodes and having at least one menu electrode for selecting a function or mode when the cursor or stylus is in proximity with the menu electrode.

Another object of the invention is to provide a charge ratio tablet wherein digitization and mode selection can both be performed using the hand-held cursor or stylus.

These objects are attained in accordance with the invention by providing a charge ratio digitizer with at least one menu electrode, which menu electrodes are driven by the same driving signal which drives one or more of the X, Y and B electrodes. These menu electrodes are constructed so that a signal is induced in the cursor or stylus when in proximity to a driven menu electrode, which signal is outside the range of signals induced in the cursor when in proximity with the simultaneously driven X, Y and B electrodes. The processing circuitry is programmed to first detect that the cursor is out of proximity with the coordinate determination area formed by the X, Y and B patterned electrodes and to then detect which, if any, menu electrode the cursor or stylus is in proximity with. This is accomplished by sequentially testing the amplitudes of the signals induced during a driving cycle. The processing circuitry then responds to detection of a predetermined signal in accordance with its program instructions.

In the preferred embodiment of the invention, first and second pluralities of menu electrodes are formed on the surface of the tablet and outside the coordinate determination area formed by the X, Y and B electrodes. Each plurality comprises three menu electrodes of substantially identical structure, wherein the menu electrodes of the first plurality have a structure which is different than the structure of the menu electrodes of the second plurality. In each plurality, the first menu electrode is driven by the same driving signal which drives the X electrode, the second menu electrode is driven by the same driving signal which drives the Y electrode, and the third menu electrode is driven by the same driving signal which drives the B electrode. The structure of each menu electrode of the first plurality (hereinafter the "first structure") and the structure of each menu electrode of the second plurality (hereinafter the "second structure") are such that the signal induced in th cursor or stylus in response to driving a menu electrode having the first structure is different than the signal induced in the cursor or stylus in response to driving of a menu electrode having the second structure, this difference in induced signal being detectable by the processing circuitry.

In view of this capability to detect the difference in induced signal attributable to the difference in structure of the menu electrodes of the respective pluralities, the processing circuitry is able to determine whether the cursor is in proximity to a menu electrode of the first plurality or a menu electrode of the second plurality, i.e. is able to determine which plurality has a menu electrode capacitively coupled to the cursor electrode.

Further, because the X, Y and B electrodes (and corresponding menu electrodes) are driven in sequence, the processing circuitry is able to determine which one of the three menu electrodes in that plurality is capacitively coupled to the cursor electrode by determining which of the sequential driving signals preceded detection of the induced signal from the cursor electrode.

Therefore, in the preferred embodiment the processing circuitry is able to detect which of six menu electrodes (i.e. menu spots) the cursor electrode is in proximity with. The processing circuitry then performs a function or initiates a mode corresponding to the selected menu spot. The processing circuitry is programmable in dependence on the menu of functions or modes required by the customer.

Still other objects and advantages of the invention will in part be obvious and will in part be apparent from the specification.

BRIEF DESCRIPTION OF THE DRAWINGS

The invention will be described in detail with reference to the accompanying drawings, in which:

FIGS. 7A-7C depict three portions of the printed circuitry on the tablet of the charge ratio digitizer in accordance with the invention;

FIG. 8 is a timing diagram for the digitizer in accordance with the invention;

DETAILED DESCRIPTION OF THE PREFERRED EMBODIMENTS

Figure 1:
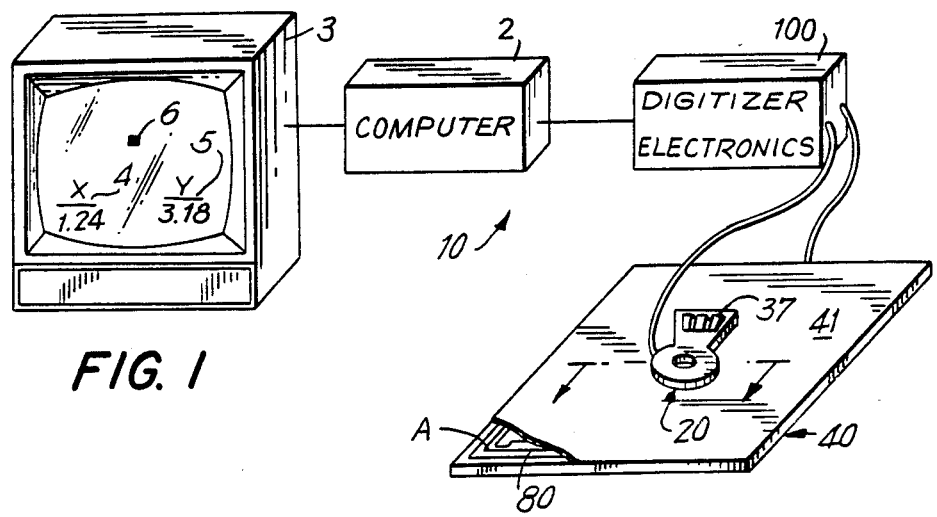
FIG. 1 is a perspective, partially schematic view of a digitizer being used in conjunction with a computer system.
Figure 6A:
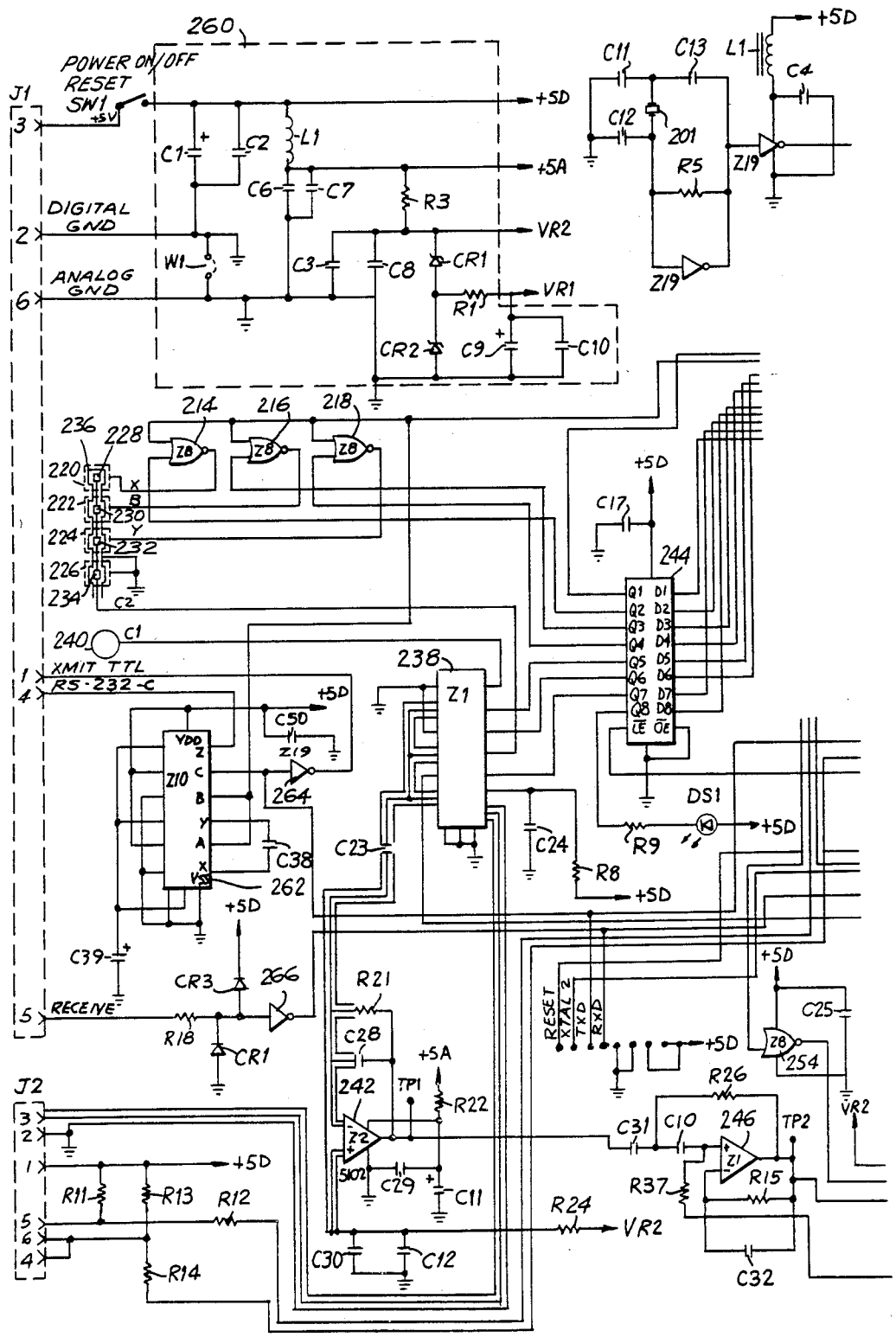
FIGS. 6A and 6B are two parts of the detailed circuit diagram of the printed circuit board incorporated in the tablet wherein the X, Y and B electrodes are driven.
Figure 6B:
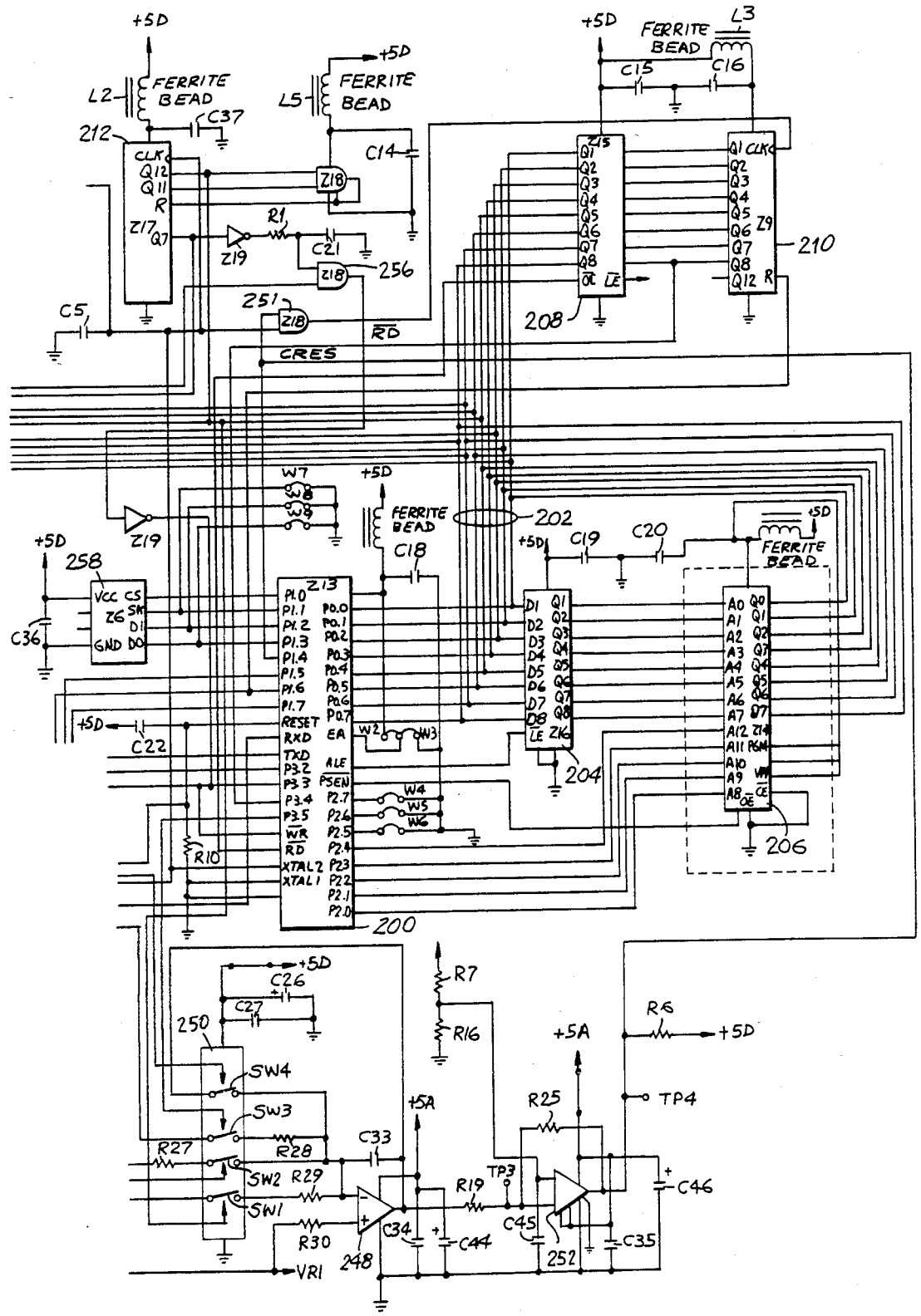

With reference to FIG. 1, a strip and wedge digitizer 10 generally comprises a cursor 20 or stylus (not shown in FIG. 1), a tablet 40 and electronics 100 for providing an input signal to the cursor and processing output signals from the tablet or alternatively, for providing an input signal to the tablet and processing output signals from the cursor. In the preferred embodiment of the invention, the digitizer electronics 100 are incorporated in the tablet 40, beneath the layers shown in FIG. 2 and inside a casing. The circuit diagram for printed circuit board of this preferred embodiment is shown in FIGS. 6A and 6B.

As illustrated in FIG. 1, the digitizer 10 is used as an input device to a computer 2 which generally has a display monitor 3 associated therewith. The monitor 3 may display numeric values of the coordinates representing the position of the cursor 20 relative to the tablet 40, as indicated at 4 and 5 on the monitor display screen. The monitor may also be used to display a cursor dot 6, the position of which on the screen is controlled by the position of the cursor 20 on the tablet 40.

Figure 2:
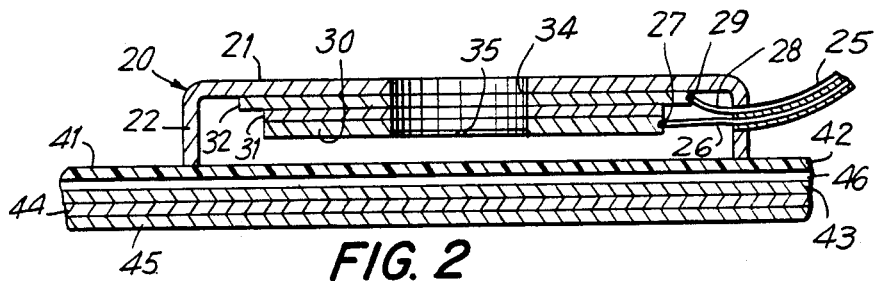
FIG. 2 is an enlarged cross-sectional view of a portion of the active area of a digitizer tablet and a cursor positioned thereon.

A cross-sectional view of the cursor 20 and a fragmentary portion of the tablet 40 is shown in FIG. 2. However, although a cursor is described, it is obvious that the tablet can be used in conjunction with a stylus instead of a cursor. The cursor 20 includes a housing 21 having a depending peripheral side wall 22, which slides on the surface of the digitizer tablet 40. Mounted on the underside of the housing 21 (by means not shown) is an annular ground or shield electrode 32. An annular dielectric spacer 31 is fixedly arranged beneath the ground shield electrode 32 in abutment therewith. An annular coupling electrode 30 is fixedly arranged beneath the dielectric spacer 31 in abutment therewith such that the coupling electrode 30 will lie substantially parallel to the tablet surface when the rim of side wall 22 is seated on the tablet surface. The shield electrode 32 is somewhat larger in diameter than the coupling electrode 30 and overhangs the coupling electrode 30 about its peripheral edge.

The coupling electrode 30, dielectric spacer 31 and ground electrode 32, together with the cover 21, defined a central circular opening 34 in which cross-hairs 35 are positioned. The cross-hairs 35 are centered with respect to the coupling electrode 30. The inner and outer peripheries of the coupling electrode are preferably circular, although other shapes would be suitable provided that the orientation of the cursor does not affect its electrical coupling with the tablet electrodes. An electrical cord 25 connects the cursor 20 to the digitizer electronics 100, the cord 25 including a signal conducting wire 26 which is connected to the coupling electrode 30 at a terminal 27. A coaxial surrounding conductor 28, that is, a coaxial shield, is connected to the ground or shield electrode.32 within the cursor 20 at a terminal 29. In an embodiment where the cursor is driven, a driving signal is provided to the coupling electrode 30 by way of the signal wire 26 as explained hereinafter. In an embodiment wherein the tablet electrodes are driven, induced signals will be outputed via wire 26.

The cursor housing 21 has a shape which can comfortably fit in the hand of a user and may be provided with a series of push-button switches 37 (see FIG. 1) for communicating with the computer 2.

Alternatively and preferably, the cursor can be replaced by a pressure-sensitive stylus similar to that disclosed in U.S. patent application Ser. No. 28,494 filed Mar. 20, 1987, assigned to the assignee of the present invention and entitled DIGITIZER STYLUS WITH PRESSURE TRANSDUCER, the disclosure of which is incorporated herein by reference.

The stylus output signal can be sampled during a separate sampling cycle to determine the amplitude of a signal which is a function of the pressure being exerted on th stylus tip (see pressure cycle in FIG. 8). In this sampling cycle the stylus is disabled in the sense that no current is capacitively induced in the anode of the stylus. Instead a voltage is applied across the terminals of the stylus which produces a current in a circuit including a force-sensing resistant transducer which acts as a variable resistor. The transducer is made of a force-sensing resistant (FSR) material, the resistance of which varies in dependence on the amount of compressive force being exerted in a direction substantially perpendicular to the plane of the transducer layer. The resistance of the FSR transducer decreases as the magnitude of the compressive force increases. This variation in resistance of the FSR material produces a corresponding change in the dc level of the analog signal output during the pressure sampling cycle.

The dc level of the analog signal output from the pressure-sensitive stylus can be detected using a comparator incorporated in the digitizer electronics. The dc level of the analog signal is compared with a reference voltage supplied to the comparator. As the pressure on the stylus tip is increased, the resistance of the FSR transducer decreases, whereby the dc level of the analog signal increases. When the dc level of the analog signal exceeds the reference voltage, the comparator output goes high. In response to the comparator output going high, a switch is closed which enables the flow of digitizing data from the stylus to the processing circuitry of the digitizer electronics during the X, Y and SUM driving cycles. The digitizing data, corresponding to the signals induced in the anode by the driven patterned electrode or electrodes of the charge ratio tablet during the driving cycles, as disclosed in U.S. patent application Ser. No. 28,499 filed Mar. 20, 1987, assigned to the assignee of the present application and entitled METHOD AND APPARATUS FOR CALIBRATION OF A CHARGE RATIO DIGITIZER are also outputed via the stylus terminal, but at different times in the sampling cycle. The disclosure of the foregoing copending application is incorporated herein by reference.

Thus, the FSR transducer of the pressure-sensitive stylus functions as a variable resistor, a switch in the digitizer electronics being closed in response to the variable resistance attaining a predetermined value. This predetermined resistance value should be attained at a pressure slightly less than the amount of pressure generally exerted on the tip of the pen refill when the stylus is used to write by a user. The position of the stylus tip relative to the digitizer tablet is determined only for those positions of the stylus tip at which the pressure of the tip against the tablet exceeds a predetermined pressure value, i.e. for those positions when the stylus is being used to write. This predetermined pressure value is the pressure at which the analog signal output from the stylus exceeds a stored predetermined analog value. In response to the stylus output signal surpassing the predetermined stored value, determination of the position of the stylus tip will begin. Likewise when the pressure exerted by the stylus tip falls below the predetermined stored value, position determination is halted.

The digitizer tablet 40 is generally rectangular and has a planar top surface 41 on which the cursor 20 moves (see FIG. 1). In accordance with the invention, the top surface 41 includes a first area overlying the X, Y and B electrodes and a second area overlying the menu electrodes, the second area lying outside the first area, as best seen in FIG. 7A, to be discussed in detail hereinafter.

Predetermined cursor positions in the first area of the top surface 41 can be expressed as values in a finite two-dimensional coordinate system. However, it should be noted that only a rectangular portion of the first area constitutes the active coordinate determination area coextensive with the finite two-dimensional coordinates. Thus, although the X, Y and B electrodes extend beyond the active coordinate determination area and underlie portions of the peripheral margins of the tablet, these margins are inactive in the sense that the coordinates of the cursor are not determinable when the cursor overlies a margin. In the preferred embodiment, this is effected by providing a border of copper shielding 46 between the top layer 42 and the electrode layer 44 (see FIG. 2). (Of course, shielding would not be provided over the menu electrodes, as will be discussed in detail hereinafter). Alternatively, the same result can be achieved by programming the microprocessor to not process $X_{in}$ and $Y_{in}$ values greater or less than predetermined limits corresponding to the edges of the active coordinate determination area. Therefore, cursor positions overlying the inactive margins will not have corresponding x, y coordinates. The coordinate system used in a preferred embodiment is the orthogonal x-y coordinate system.

Figure 7B:
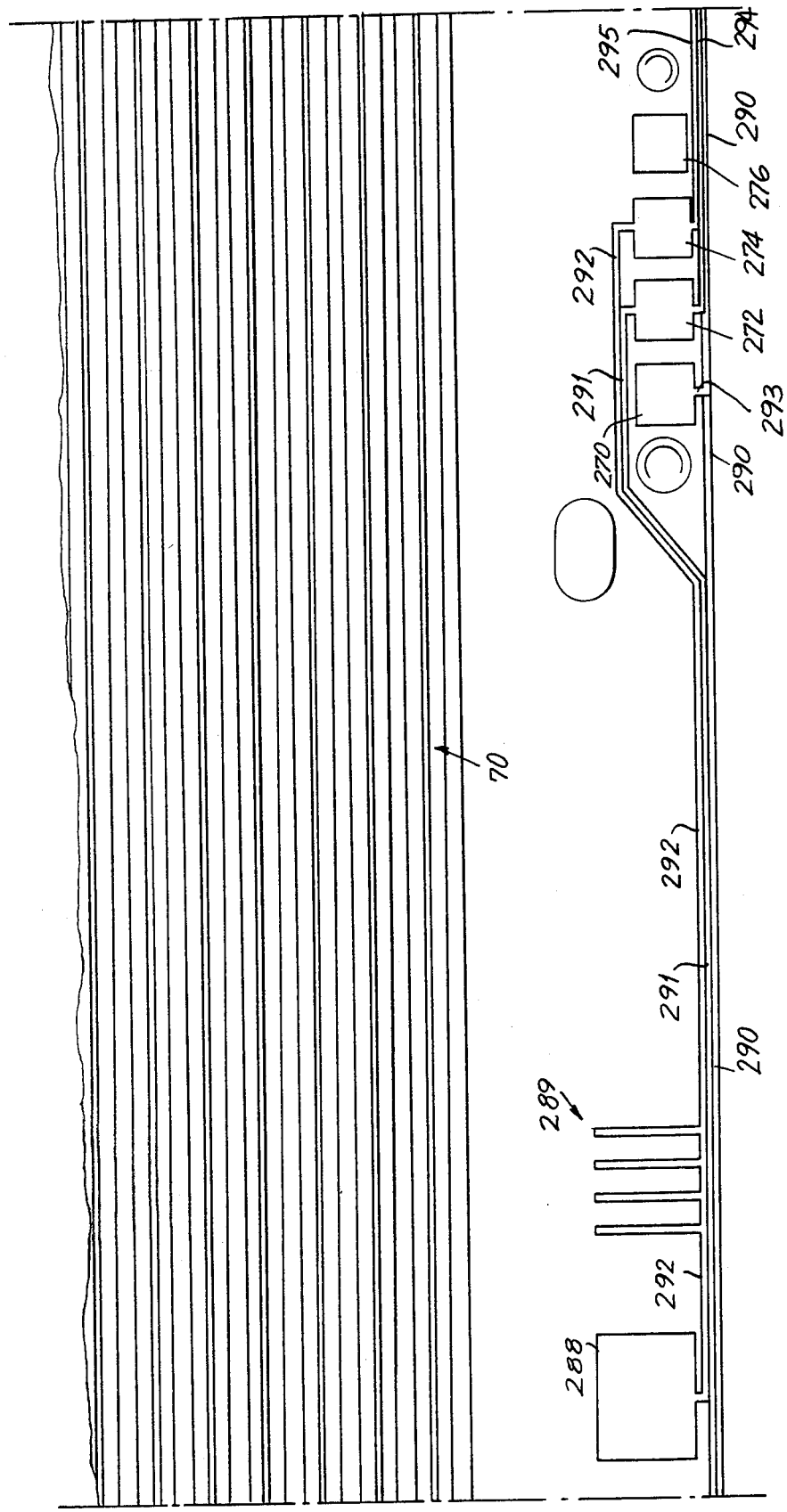
Figure 7C:
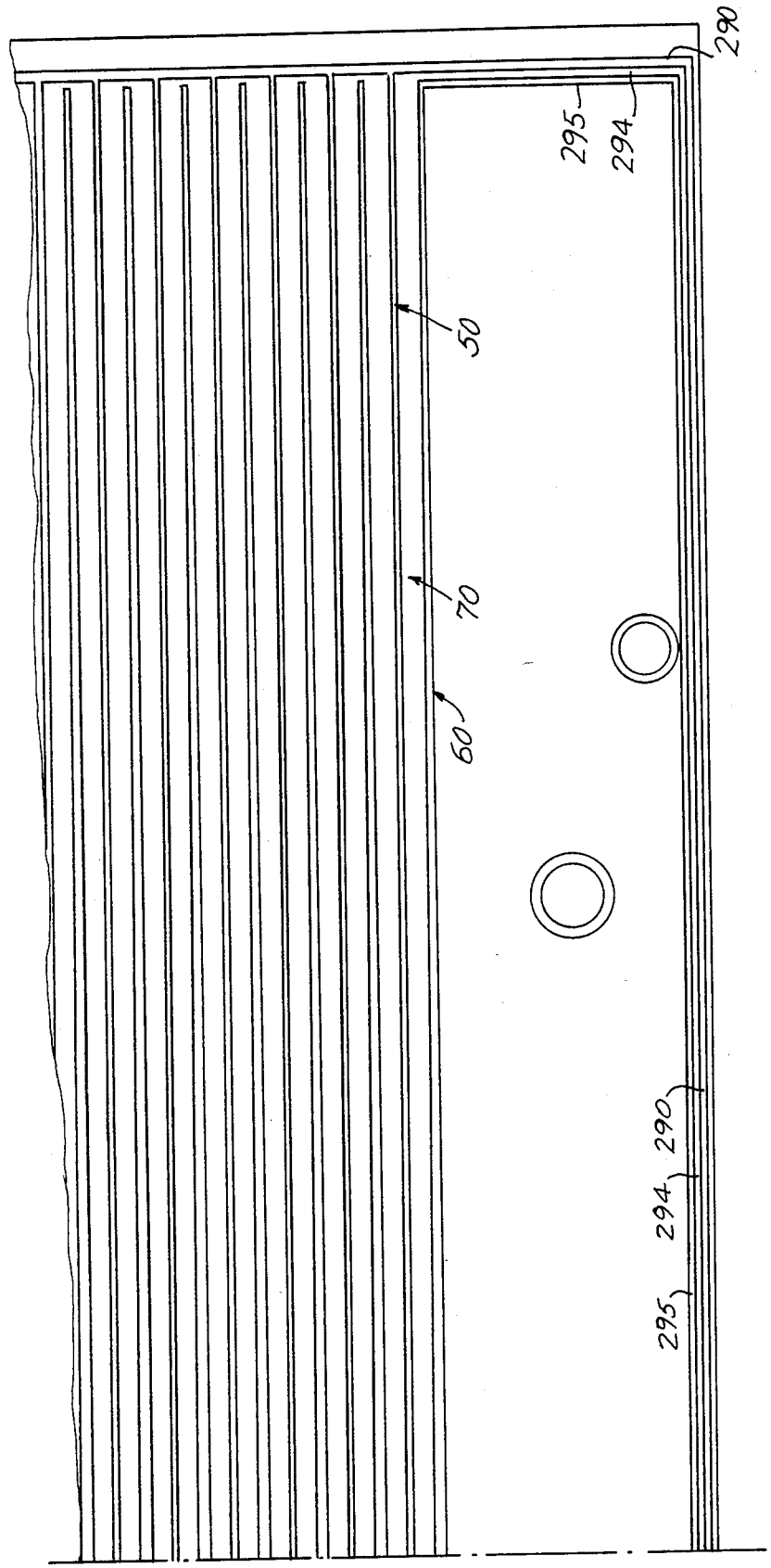

The digitizer tablet 40 includes a plastic cover 42. As indicated, the cover 42 provides the smooth upper surface 41 of the digitizer tablet 40. Beneath the cover 42 and outside the active areas of the tablet is a copper shield border 46. Beneath the copper shield border 46 is a layer 43 of dielectric material. The electrode layer 44, comprising the X, Y and B electrodes, the menu electrodes, the junction electrodes, and connecting conductors (as shown in FIGS. 7A-7C), is applied directly on the dielectric layer. An insulating layer 45 lies beneath the electrode layer 44.

Figure 4:
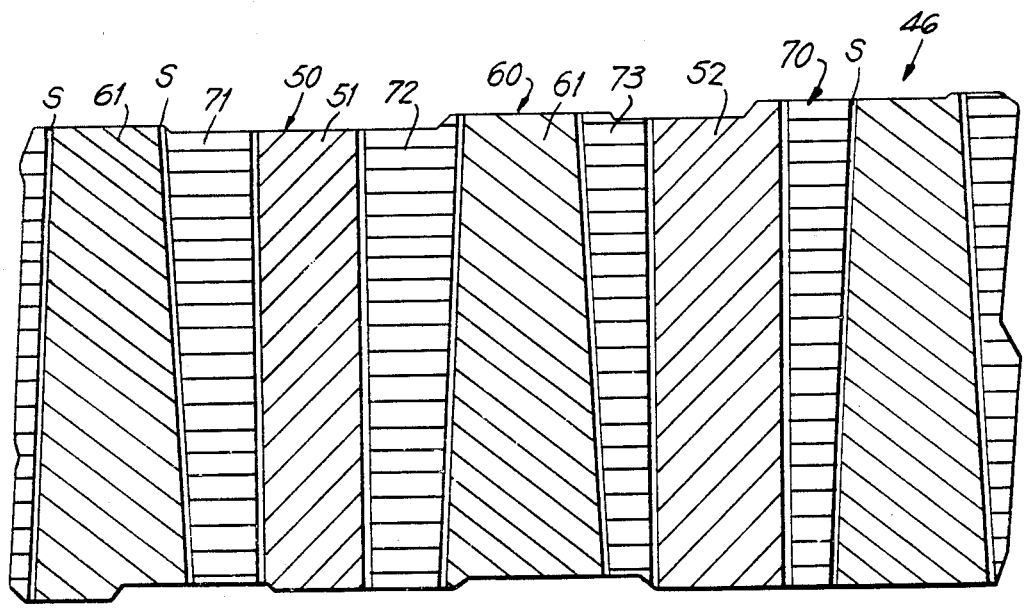
FIG. 4 is a greatly enlarged fragmentary view of a portion of the surface of FIG. 6.
Figure 3:
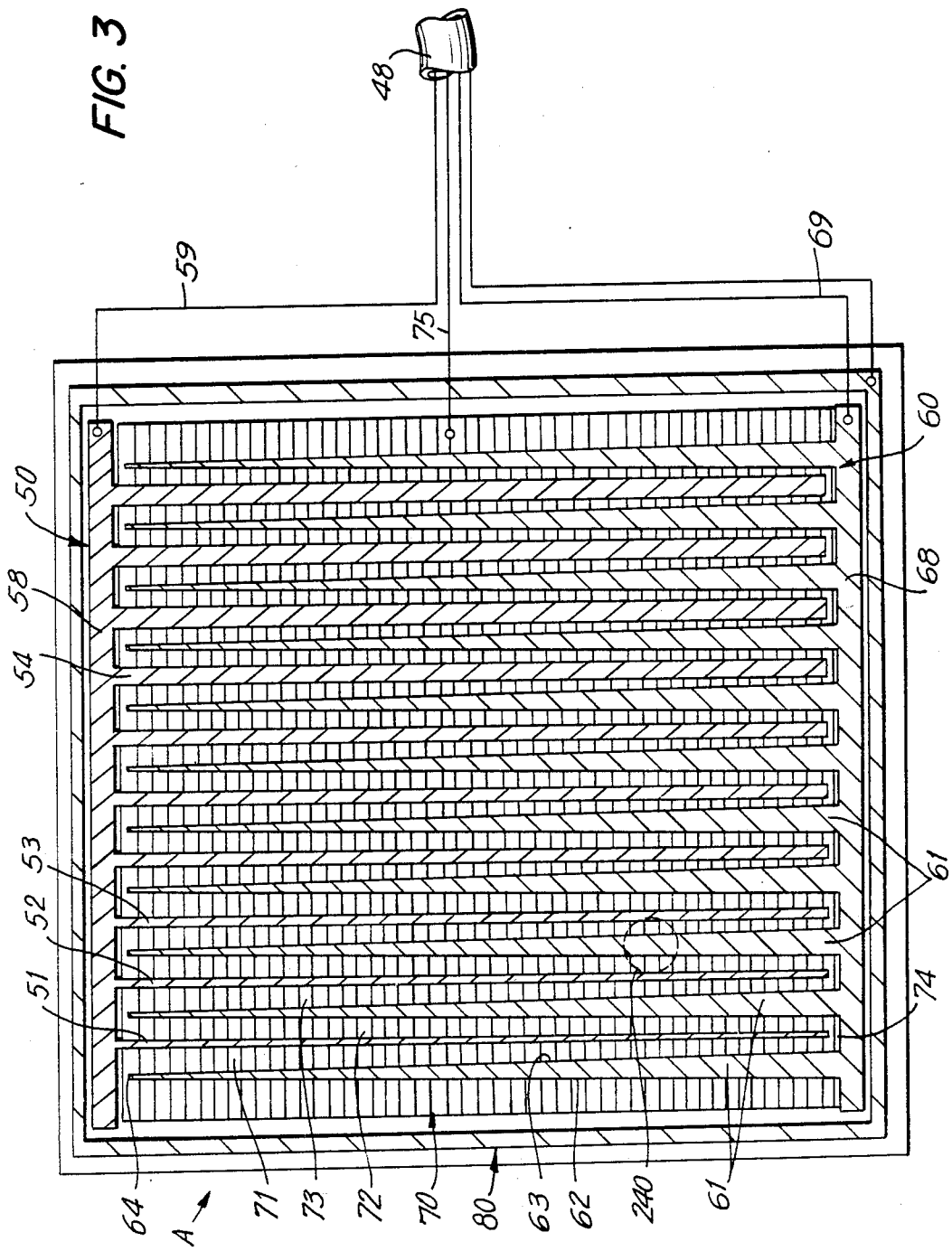
FIG. 3 is a schematized top view of a prior art wedge-and-strip digitizer tablet electrode pattern.

In one embodiment of the prior art digitizer, the digitizer tablet is connected to the electronic circuitry by a multi-conductor cable 48, as shown in FIG. 3. FIGS. 3 and 4 depict the basic prior art structure of the X, Y and B electrodes. The electrode layer 46 of the digitizer tablet 40 includes a patterned electrode 50 which varies in the X direction, a patterned electrode 60 which varies in the Y direction, and a patterned electrode 70 arranged between the X and Y electrodes for providing a balance (B) signal. The electrodes 50, 60, 70 are laid out in a substantially coplanar and rectangular overall configuration and may be surrounded in the same plane by a shield electrode 80. Since FIG. 3 shows a prior art tablet, it does not show the menu electrodes incorporated in the tablet in accordance with the invention.

The X electrode 50 includes a plurality of strips, e.g. strips 51, 52, 53, 54, which are connected together along one edge of the electrode layer 46 by an x-axis bus 58. The strips extend in the y direction from one side of the bus 58. The strips are substantially parallel to each other and have center lines spaced apart at substantially equal intervals. However, the individual strips increase progressively in width in the x direction from one side of the tablet 40 to the other side. Thus, the strip 52 is wider than the next strip 51, and strip 53 is wider than strip 52, and so forth across the surface. Electrical signals which are accumulated on any of the strips are conducted by way of the bus 58 to an x-axis signal lead 59, which becomes part of the multi-conductor digitizer tablet cable 48.

The y electrode 60 has a sawtooth or wedge pattern with similar individual wedges interleaved with the strip pattern of the X electrode 50. The Y electrode 60 includes a plurality of wedges 61 extending in the Y direction, the wedges 61 being connected together by a y-axis bus 68. Each individual wedge 61 comprises an elongated substantially triangular area having edges 62 and 63, which converge as the wedge extends from the bus 68 to a narrow terminal end 64 adjacent to the x-axis bus 58. The wedges 61 are evenly spaced intermediate to adjacent strips such that the wedges and strips are interleaved. The Y electrode 60 has its bus 68 connected to the digitizer electronics 100 by way of a signal lead 69 which becomes part of the multi-conductor cable 48.

The electrode layer 46 of the digitizer tablet 40 also incorporates a balance (B) electrode 70, which substantially covers the area of the electrode layer 46 between the areas covered by the X and Y electrodes 50, 60, except for the gap which remains between adjacent electrodes. The B electrode 70 takes the form of elongate legs, e.g. 71, 72, 73, which are arranged in a serpentine manner between the interleaved wedges and strips and between the tips of the wedges and strips and the opposing respective bus. For example, legs 71 and 72 flank strip 51, and legs 72 and 73 flank wedge 61. The legs of the B electrode are connected together by connecting sections adjacent to the x-axis bus 58 and y-axis bus 68, e.g. legs 71 and 72 are connected by section 74 between the end of strip 51 and the y-axis bus 68. The B electrode 70 is connected to the digitizer electronics 100 of the digitizer by means of a signal lead 75 which becomes part of the multi-conductor cable 48.

The electrode layer 46 further comprises a shield electrode 80, which is deployed about the perimeter of the X, Y and B electrodes. The shield electrode 80 may be connected to the shield of the cable 48, as indicated in FIG. 3.

The electrodes 50, 60 and 70 are electrically isolated from each other as the result of the gap separating the electrodes. The gap between electrodes is more clearly illustrated in FIG. 4, which is an enlarged fragmentary view of the electrode layer 46 illustrated in FIG. 3. The small spacing or gap provided between all of the adjacent electrode edges is indicated by the letter S. The spacing is generally constant for a given electrode layer 46 but will vary between production sources and production runs.

It should be understood that FIG. 4 is illustrated in enlarged scale and schematically for purposes of illustration. Actual strips, wedges and spacing S are much finer than are illustrated in this drawing. In an embodiment which performed satisfactorily, there are five x-axis pattern strips and five y-axis pattern wedges per inch. The increase in width from one x-axis strip to the adjacent x-axis strip, for example, between strips 52 and 53 of FIG. 3, was approximately 0.001 inch.

The digitizer tablet 40 has a useful coordinate determination surface confined to the area of the wedges and strips, respectively, of the X and Y electrodes 50, 60, and the useful digitizing surface generally does not include the x-axis bus 58 and y-axis bus 68.

The coupling electrode 30 of the cursor 20 (see FIG. 2) and the coupling electrode (anode) of the pressure-sensitive stylus (not shown) are sized and spaced from the table 40 such that the coupling electrode is capacitively coupled to a plurality of strips and wedges, preferably at least five, during driving of the X and Y electrodes. Thus, at any given time, several elements of each of the X, Y and B electrodes are coupled to the coupling electrode.

The X electrode 50, Y electrode 60, and B electrode 70 may be formed of copper, silver, conductive ink or any other conductive material deposited on a printed circuit board material, wherein the printed circuit board forms the dielectric layer 43 of the digitizer tablet 40. Other fabrication techniques include printing the electrodes in conductive ink on a thin film of Mylar or similar material, and affixing the film with the electrodes printed thereon to either the top surface of dielectric layer 43 or the bottom surface of plastic cover 42 of the digitizer tablet 40.

The wedge-and-strip digitizer operates by capacitive coupling between the coupling electrode 30 of the cursor 20 and the patterned X, Y and B electrodes of the digitizer tablet 40. In one embodiment, a driving signal input to the cursor 20 is coupled to the electrodes 50, 60, 70 of the tablet 40, and the resultant signals outputed from the tablet electrodes are processed to determine the x and y coordinates of the cursor position on the tablet surface 41.

In the preferred embodiment of the invention, the electrodes 50, 60, 70 and associated menu electrodes of the digitizer tablet 40 are driven by a square wave oscillator in sequence and signals coupled to the cursor are provided to the electronic circuit shown in FIGS. 6A and 6B for processing on a sequential basis to determine the x, y coordinates of the cursor position on the tablet 40 or alternatively to determine the function or mode selected by the user from the menu 300.

A phantom cursor electrode 240 is arranged on the printed circuit board for the processing electronics shown in FIGS. 6A and 6B. The rest of the processing circuitry is shielded from the electrode 44 by a shielding layer (not shown). The phantom cursor electrode is located such that it can be capacitively coupled to a portion of the electrode layer 44 near a corner of the tablet. The center of the phantom cursor electrode has predefined x, y coordinates. The phantom cursor electrode comprises a circular conductive plate opposing electrode layer 44, with an air space therebetween, and has dimensions such that the plate underlies at least one wedge and one strip. The phantom cursor 240 is also indicated by the dashed circle on the tablet of FIG. 3. It should be understood that the size of the phantom cursor, although enlarged relative to the tablet dimensions in FIG. 3, is shown in a roughly accurate scale relative to the widths of the wedges and strips. This is due to the fact that the wedges and strips are also not shown in their true size relationship to the tablet. Although a tablet may, for example, be 12 inches on a side, the base of each wedge is, for example, only 0.021 inch and the diameter of the phantom cursor is 0.042 inch in working prototypes. Thus, each digitizer tablet in accordance with the invention has many more wedges and strips than the number depicted in FIG. 3.

The phantom cursor electrode 240 is directly connected to the digitizer electronics by line C1 as shown in FIG. 6A.

In accordance with the invention, the digitizer tablet is expanded to include a menu in addition to the coordinate determination area depicted in FIG. 3. This menu comprises a plurality of menu electrodes which are respectively driven by the same driving signals which drive the X, Y and B electrodes. Although the menu electrodes arranged in an expanded tablet could be connected to junctions along conductors 50, 69, 75 (FIG. 3), in the preferred embodiment of the invention, the menu electrodes and X, Y and B electrodes are connected to a zebra strip arrangement as detailed below.

Figure 5:
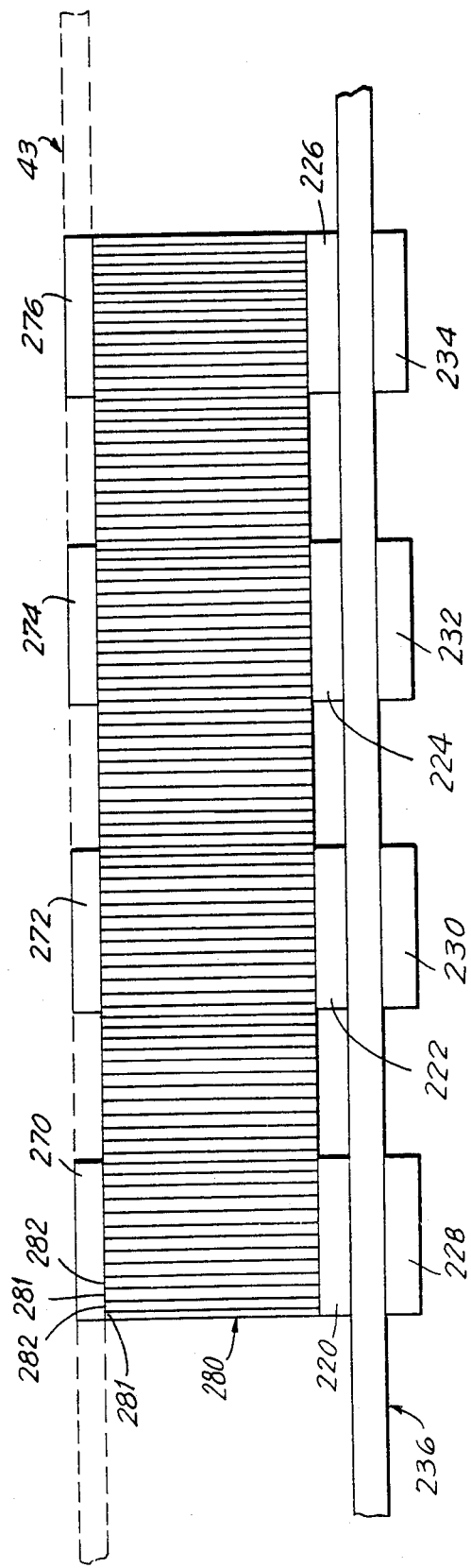
FIG. 5 is an enlarged side view of the zebra strip arrangement for connecting the electronics printed circuit board and the tablet.

FIG. 5 shows the preferred connection between the digitizer electronics 100 and the digitizer tablet 40 in accordance with the invention. In contrast to the embodiment depicted in FIGS. 1 and 3, the digitizer electronics and tablet are not connected by a multi-line cable, but rather are connected by a zebra strip 280 which consists of a multitude of alternating conducting and insulating layers 281 and 282 stacked in sandwich fashion. Each layer is made of flexible material, e.g. metal foil and plastic. A first plurality of the conducting layers 281 of zebra strip 280 connect conductive junction electrodes 220 and 270, a second plurality connect conductive junction electrodes 222 and 272, a third plurality connect conductive junction electrodes 224 and 274, and a fourth plurality connect conductive junction electrodes 226 and 276. Each junction electrode comprises a conductive plate. The junction electrodes 220, 222, 224 and 226 are respectively connected to driving circuits 214, 216, 218 and ground (see FIG. 8A). The driving signals from driving circuits 214, 216 and 218 are conducted by junction electrodes 220, 222 and 224 respectively, by zebra strip 280, and by junction electrodes 270, 272, and 274 respectively.

As best seen in FIGS. 7A-7C, the junction electrodes 270, 272 and 274 in the preferred embodiment are respectively electrically connected to the X, B and Y electrodes. In accordance with the invention, junction electrodes 270, 272 and 274 are also respectively electrically connected to menu electrodes 284, 286 and 288 and to menu electrodes 285, 287 and 289. In the preferred embodiment of the invention, each of menu electrodes 284, 286 and 288 takes the form of a plate and each of menu electrodes 285, 287 and 289 takes the form of a plurality of bar electrodes.

As shown in FIGS. 7A-7C, menu electrodes 284 and 285, junction electrode 270 (by way of conductor 293) and bus 55 of X electrode 50 are each connected to bus conductor 290, forming a first circuit whereby the X driving signal received by junction electrode 270 is simultaneously transmitted to menu electrodes 284, 285 and X electrode 50. Menu electrodes 286 and 287 are connected to junction electrode 272 by way of bus conductor 291, and junction electrode 272 is connected to the B electrode 70 by way of bus conductor 294, forming a second circuit whereby the B driving signal received by junction electrode 272 is simultaneously transmitted to menu electrodes 286 and 287 and B electrode 70. Menu electrodes 288 and 289 are connected to junction electrode 274 by way of bus conductor 292, and junction electrode 274 is connected to the Y electrode 60 by way of bus conductor 295, forming a third circuit whereby the Y driving signal received by junction electrode 276 is simultaneously transmitted to menu electrodes 288 and 289 and Y electrode 60.

The menu electrodes 284, 286, 288 are each configured such that if the coupling electrode of the stylus is capacitively coupled to a driven one of menu electrodes 284, 286, 288, the signal induced in the stylus will be outside the range of signals induced in the stylus when the stylus is capacitively coupled to the X, Y and B electrodes during driving of all three simultaneously. Moreover, the menu electrodes 285, 287, 289 are each configured such that if the coupling electrode of the stylus is capacitively coupled to a driven one of menu electrodes 285, 287, 289, the signal induced in the stylus will be outside the range of signals induced in the stylus when the stylus is capacitively coupled to the X, Y and B electrodes during driving of all three simultaneously. Furthermore, the pair of signals induced in the stylus when the stylus is capacitively coupled to one of the six menu electrodes during the X and Y driving cycles (see FIG. 8) fall into different pairs of ranges for each menu electrode. These differences in the induced signals enable the processing circuitry to first determine whether the stylus is capacitively coupled to the coordinate determination electrodes (X, Y and B), and if not, then to determine which, if any, menu electrode the stylus is capacitively coupled to.

The menu electrodes 284-289, conductors 290-295, and junction electrodes 270, 272, 274, and 276 are all formed as part of the electrode layer 43.

The junction electrodes 220, 222, 224 and 226 are mounted on the printed circuit board 236 of the digitizer electronics 100. Printed circuit board 236 is made of dielectric material. On the other side of P.C. board 236, conductive plates 228, 230, 232 and 234 are arranged in opposition to junction electrodes 220, 222, 224 and 226 respectively. The respective pairs of opposing plates separated by the dielectric P.C. board 236 form an array of capacitors. Therefore, when the driving signals from driving circuits 214, 216 and 218 pass through junction electrodes 220, 222 and 224 respectively, corresponding signals are capacitively induced in plates 228, 230 and 232 respectively.

The structure of the hardware according to the preferred embodiment of the invention will now be described in detail with reference to FIGS. 6A and 6B.

The digitizer electronics includes a microprocessor 200 comprising an 8031 chip manufactured by Intel. However, it would be obvious to those of ordinary skill in the art that other 8-bit microprocessors could be substituted for the 8031 chip. Microprocessor 200 controls driving of the X, Y and B electrodes, mode selection, integration of the cursor output signal, transmission of the position coordinates, and resetting and enabling of the counting, switching, latching and memory chips to be described in detail below.

Pins P0.0 to P0.7 of microprocessor 200 are connected to pins D1-D8 of buffer 204. The address logic enable (ALE) pin of microprocessor 200 is connected to the latch enable (LE) pin of buffer 204. The output terminals Q1-Q8 of buffer 204 (i.e. pins Q1-Q8) are respectively connected to pins A0-A7 of external memory chip 206. Pins P2.0-P2.4 of microprocessor 200 are respectively connected to pins A8-A12 of external memory chip 206. The output terminals (i.e. pins Q0-Q7) of memory chip 206 are respectively connected to the lines of data bus 202. The lines of data bus 202 are respectively connected to the lines connecting microprocessor 200 and buffer 204. Pin PSEN of microprocessor 200 is connected to the output enable (OE) pin of external memory chip 206. External memory chip 206 has program instructions stored therein. A listing of some of these program instructions is annexed hereto as Appendices A and B. These program instructions respectively correspond to the flowcharts depicted in FIGS. 9 and 10, to be discussed in detail hereinafter.

The lines of data bus 202 are also respectively connected to the output terminals (i.e. pins Q1–Q8) of buffer chip 208. The output enable (OC) pin of buffer chip 208 is connected to the read (RD) pin of microprocessor 200. The input terminals (i.e. pins D1–D8) of buffer chip 208 are respectively connected to the output terminals (i.e. pins Q1–Q8) of counter 210. The reset terminal (R) of counter 210 is connected to pin P1.6 of microprocessor 200. Pin CLK of counter 210 receives clocking signals from oscillator 201 by way of AND gate 250.

Oscillator 201 is also connected to the CLK pin of counter 212. Clock 212 divides the 11.0592-MHz signal from oscillator 201 and outputs an 86-kHz signal at pin Q7. This 86-kHz signal takes the form of a square wave oscillation which is directly provided to drivers 214, 216 and 218. Drivers 214, 216 and 218 are respectively connected to junction electrodes 220, 222 and 224 arranged on one side of the printed circuit board. A fourth junction electrode 226 is connected to ground.

As clearly shown in FIG. 5, junction electrodes 220, 222, 224 and 226 are respectively opposed by conductive plates 228, 230, 232 and 234. These opposing plates from the anode and cathode of respective capacitors and are separated by a layer of dielectric material 236. The conductive plates 228, 230, 232 and 234 are connected in series to pin 15 of switching circuit 238.

The phantom cursor 240, which is embedded on the control board, is connected to pin 4 of switching chip 238. The stylus or cursor is connected to terminal 3 of connector J2, which is in turn directly linked to pin 14 of switching chip 238. Switching circuit 238 is switched under the control of microprocessor 200 such that a selected one or neither of the signals received at pins 4 and 14 is outputed to the negative terminal of preamplifier 242. The switching state of switching chip 238 will depend on the control bit data received at pins 9, 10, and 11, which are directly connected to output pins Q5, Q6 and Q7 of latching chip 244.

Latching chip 244 receives an eight-bit signal (at pins D1–D8) from microprocessor 200 by way of data bus 202. As previously mentioned, three bits of this eight-bit signal control the switching state of switching chip 238. Three other bits control which of the driving circuits 214, 216 and 218 will be activated. The latch enable (LE) pin of latching circuit 244 is directly connected to the write (WR) pin of microprocessor 200.

The output of preamplifier 242 is connected to the positive terminal of amplifier 246. The output terminal of amplifier 246 is in turn connected to the negative terminal of amplifier 248 by way of switch SW1 of switching circuit 250. The output terminal of amplifier 248 is connected to the positive terminal of comparator 252. The output terminal of amplifier 248 is fed back to the negative input terminal by way of capacitor C33. Amplifier 248 and capacitor C33 form an integrator. The output terminal of comparator 252 is connected to the clocking terminal CLK of counter 210. In response to the signal from amplifier 248 attaining a predetermined level, comparator outputs a signal which stops the clocking of counter 210. The output terminal of comparator 252 is also connected to pin P1.4 of microprocessor 200.

The switching circuit 250 comprises four switches SW1–SW4 which are effectively controlled by microprocessor 200. For example, pin 12 of switching circuit 250, which controls switch SW4, is directly connected to pin P1.7 of microprocessor 200. Pin 5 of switching circuit 250, which controls switch SW3, is directly connected to pin 3.5 of microprocessor 200. Pin 6 of switching circuit 250, which controls switch SW2, is connected to pin P1.6 by way of driver 254. Finally, pin 13 of switching circuit 250, which controls switch SW1, is connected to AND gate 256, the input terminals of which are operatively connected to pin Q7 of counter 212 and pin P0.0 of microprocessor 200 by way of latching circuit 244. Switching circuit 250 controls the charging, discharging and resetting of capacitor C33, which is connected in parallel with amplifier 248.

EEPROM 258 is connected to pins P1.0–P1.3 of microprocessor 200. This programmable memory provides the capability for storing special routines to be executed by the microprocessor.

Finally, the transmit (TXD) pin of microprocessor 200 is connected to pin C of level shifter 262. Pin Z of level shifter 262 is connected to terminal 7 of jack J1. Terminal 7 is utilized to transmit signals in accordance with the RS232 protocol to an external device. Pin TXD of microprocessor 200 is also connected to terminal 4 of jack J1 by way of inverter 264. Terminal 4 of jack J1 is used to transmit data to a TTL device. The receive (RXD) terminal of microprocessor 200 is connected to port 5 of jack J1 by way of resistor R18 and inverter 266.

The operation of a wedge-and-strip type digitizer incorporating a menu for function or mode selection in accordance with the invention will now be described in detail with reference to FIGS. 8–10.

A typical sampling cycle in the digitization mode (see FIG. 8) includes at least the following: (1) driving of the X electrode alone and sampling of the cursor or stylus output signal; (2) driving of the X, Y and B electrodes simultaneously and sampling of the cursor or stylus output signal; and (3) driving of the Y electrode alone and sampling of the cursor or stylus output signal. If a pressure-sensitive stylus is used in conjunction with the tablet, then the stylus output signal can be sampled during a fourth sampling cycle to determine the amplitude of a signal which is a function of the pressure being exerted on the stylus tip. The output signal from the stylus is transmitted to input pin 14 of switching chip 238 (see FIG. 6A). In switching chip 238, the signal from the stylus is switched to either output pin 12 or output pin 13 depending on the control signal (see STYLUS OUTPUT SWITCH CONTROL signal in FIG. 8) received by switching chip 238 at pin 11 from latching chip 244. When the stylus output switch control signal is high, input pin 14 is connected to output pin 12, whereby the stylus output signal is transmitted to preamplifier 242. When the stylus output switch control signal is low, input pin 14 is connected to output pin 13, whereby the stylus output signal is transmitted directly to amplifier 248. As can be seen in FIG. 8, the stylus output in response to the X, SUM and Y driving cycles is switched to preamplifier 242 and the stylus output in response to the pressure pulse sent to the stylus is switched to amplifier 248. In a fifth sampling cycle, one or more of the X, Y and B electrodes are driven and the signal input into amplifier 248 is measured for the purpose of determining the level of background noise. During this fifth sampling cycle, the stylus output switch control signal is low.

The sampling cycle for the preferred embodiment of FIGS. 6A and 6B is shown in FIG. 8. The period of each cycle is 13.9 ms. The output of the integrator (amplifier 248 and capacitor C33) is shown in the top portion of FIG. 8. First, the X electrode is driven for a time T and then the capacitor C33 discharges. The counter 210 starts to count when the capacitor C33 starts to discharge and counter 210 stops when the integrator output attains a predetermined level. Second the X, Y and B electrodes are driven simultaneously for a time T/2, following which capacitor C33 again discharges. Again the counter 210 measures the time of discharge. Third, the Y electrode is driven for a time T and the discharge time of capacitor C33 is measured by counter 210.

For these first three stages, the stylus is enabled, i.e. capacitively induced current is outputed from the stylus. In the fourth and fifth stages, the stylus is disabled and no capacitively induced current is outputed from the stylus.

In the fourth stage the pressure being exerted on the tip of the stylus by the user is measured. This stage is only necessary in those applications where a stylus is being used. The coordinates are acquired for those positions of the stylus at which the stylus is being pressed with at least a predetermined pressure against the tablet. In particular, pressure information is required when a stylus and tablet are used in connection with a signature verification system.

In the fifth stage, a background reading is taken while the stylus is disabled and while one or more of the electrodes are driven. Due to inherent and environmental noise and an offset reflecting the difference between the reference potentials of the integrator (VR1) and the comparator (VR2), even when no capacitively induced current is outputed from the stylus, the capacitor C33 will have charge stored therein, which charge will produce a finite discharge time. Since the discharge time is being used as a measure of the signal output from the stylus, the finite discharge time due to noise and the offset must be subtracted from the actual discharge time measured when the stylus is enabled. This compensation method is disclosed in U.S. patent applciation Ser. No. 28,499, assigned to the assignee of the present application and entitled METHOD AND APPARATUS FOR CALIBRATION OF A CHARGE RATIO DIGITIZER, the disclosure of which is incorporated herein by reference.

In response to successive driving of the X electrode alone, the X, Y and B electrodes simultaneously and the Y electrode alone, the values $C_X$, $C_{sum}$ and $C_Y$ are thus acquired. In theory, the ratios $2C_X/C_{sum}$ and $2C_Y/C_{sum}$ are used to determine the x and y coordinates of the cursor position. However, in practice the x and y coordinates obtained using these ratios deviate from the true coordinates of the cursor or stylus due to the aforementioned gaps between the electrodes. The data at any point and the relationships of data between points which are being digitized are modified by the space which is required between the electrodes in order to prevent electrical conduction between them. Discrepancies in results between actual digitizing and the results of calculation differ depending upon the gap spacing, whether is be, for example, 10 mil spacing, 15 mil spacing, etc. By placement of the phantom cursor 240, for example, near a corner of the tablet, at a precisely known spot, actual measured data can be combined with mathematically predicted data to determine the amount of resolution distortion due to the spacings as disclosed in U.S. patent application Ser. No. 28,499, entitled METHOD AND APPARATUS FOR CALIBRATION OF A CHARGE RATIO DIGITIZER.

Figure 9:
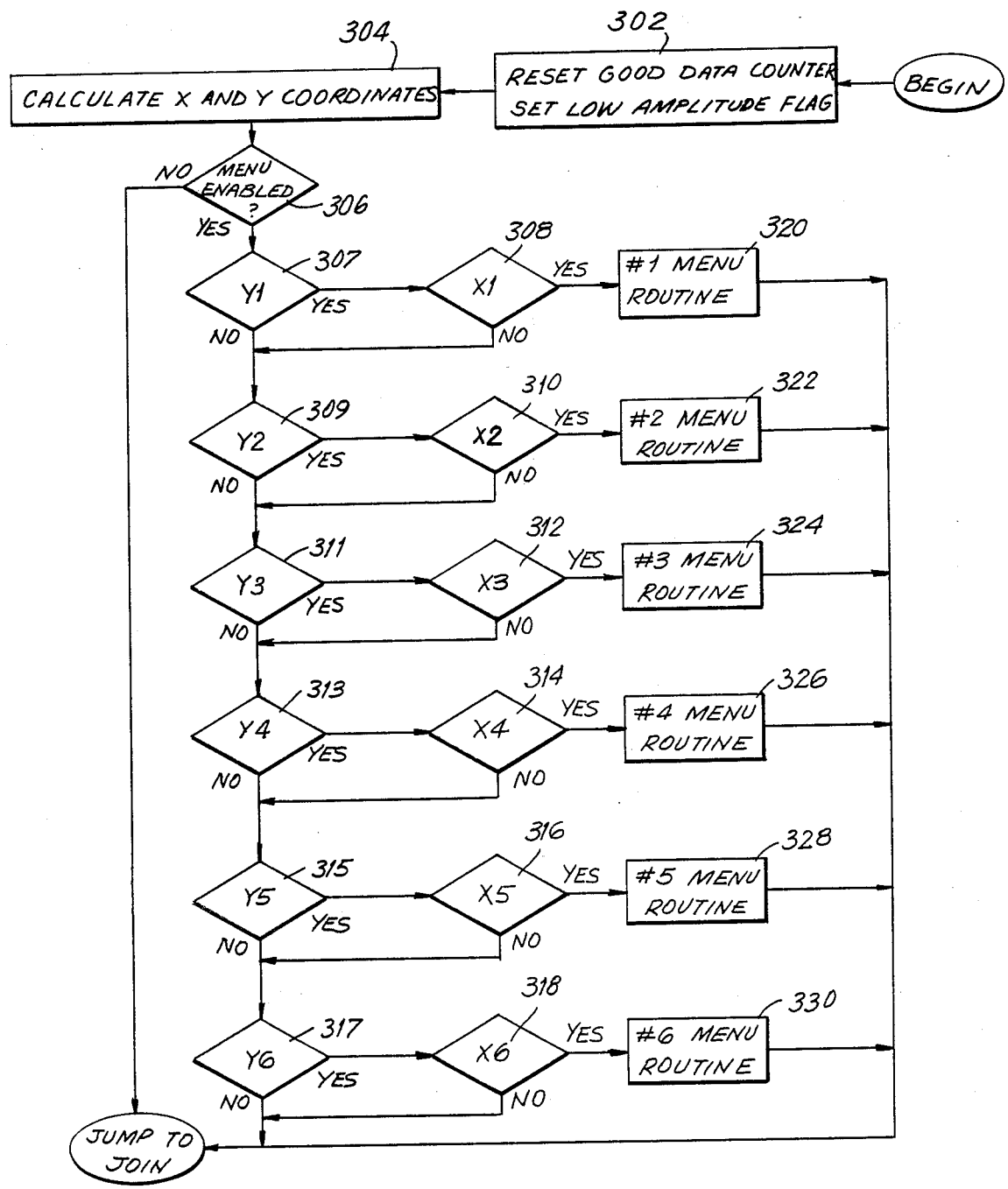
FIG. 9 is a flowchart of the charge ratio tablet menu program in accordance with the invention.

The flowchart for carrying out menu routines in response to capacitive coupling of the coupling electrode of a stylus and a selected menu electrode is shown in FIG. 9. The corresponding routine is listed in Appendix A.

As shown on lines 1912–1918 of Appendix A, the microprocessor performs a comparison of the SUM signal and a predetermined threshold for the purpose of determining whether the stylus is out of proximity with the coordinate determination electrodes. The phrase "out of proximity" is used in the sense that the degree of capacitive coupling between the stylus and the X, Y and B electrodes has fallen below an arbitrary predetermined threshold. If the comparison indicates that the stylus is out of proximity, the microprocessor carries out the "out of proximity" menu spot identification routine generally indicated in FIG. 9 and disclosed in detail in Appendix A (lines 1930–2058).

In accordance with the routine of FIG. 9, if the stylus is out of proximity, the good data counter is reset (block 302) and the low amplitude flag is set. The good data counter is used when the stylus comes back into proximity with the coordinate determination electrodes. The resetting of the good data counter is a preparatory step for coming back into proximity, but will not be described in detail here because it is not necessary for an understanding of the present invention.

In the next step the X and Y coordinates are calculated (block 304), i.e. respective counts are stored corresponding to the discharge time of the signals induced in response to the X and Y driving signals. Then the microprocessor tests to determine whether the menu function has been enabled by the user (block 306). If the menu function has been enabled, then the microprocessor proceeds to identify the menu electrode to which the stylus has been capacitively coupled by testing the X and Y values to determine if the X and Y values fall within the respective ranges corresponding to one of the six menu electrodes. In a working embodiment of the invention the X and Y limit values for each menu electrode are as follows:

| Y1 = 7000–8500, | X1 = 500–1800; |
| Y2 = 4000–6500, | X2 = 500–1800; |
| Y3 = 1000–2500, | X3 = 500–1800; |
| Y4 = 1500–3000, | X4 = 2000–4300; |
| Y5 = 1000–2500, | X5 = 6000–8500; |
| Y6 = 1800–3500, | X6 = 4500–6000; |

However, the limit values will vary in dependence on the geometry of the menu electrodes, their arrangement on the tablet, and changes in environmental conditions.

It should be noted that for any X ranges which overlap, the corresponding Y ranges do not overlap. For example, although X1, X2 and X3 lie in the same range, Y1, Y2 and Y3 lie in non-overlapping ranges. Likewise, for any Y ranges which overlap, the corresponding X ranges do not overlap. For example, Y4, Y5 and Y6 overlap, but X4, X5 and X6 do not.

Thus, the capacitively coupled menu electrode can be identified by testing the X and Y counts to determine in which ranges they respectively fall. These steps are respectively carried out as indicated by decision blocks 307 to 318 in the flowchart of FIG. 9. If the Y count is in the range Y1 and the X count is in the range X1, then in the next step (block 320) the microprocessor executes menu routine MENUS1 (see Appendix B, lines 2618-2625). If not, then the Y count is tested to determine whether it falls within the range Y2. If it does, then the X count is tested to determine whether it falls within the range X2. If the X and Y counts are respectively within the ranges X2 and Y2, in the next step (block 322) the microprocessor executes menu routine MENUS2 (see Appendix B, lines 2630-2637). If the X and Y counts do not respectively fall in the X2 and Y2 ranges, the testing procedure continues as shown in FIG. 9.

The upshot is that if any X-Y pair of counts falls within one of the six X-Y pairs of ranges, then the corresponding menu subroutine is performed. In a preferred embodiment, these menu subroutines include at least a subroutine for lowering the "out of proximity" threshold level, a subroutine for raising the "out of proximity" threshold level, a subroutine for raising the stylus pressure threshold level, and a subroutine for lowering the stylus pressure threshold level. Subroutine MENUS6 can be written to perfrom other functions selected by the user.

Figure 10:
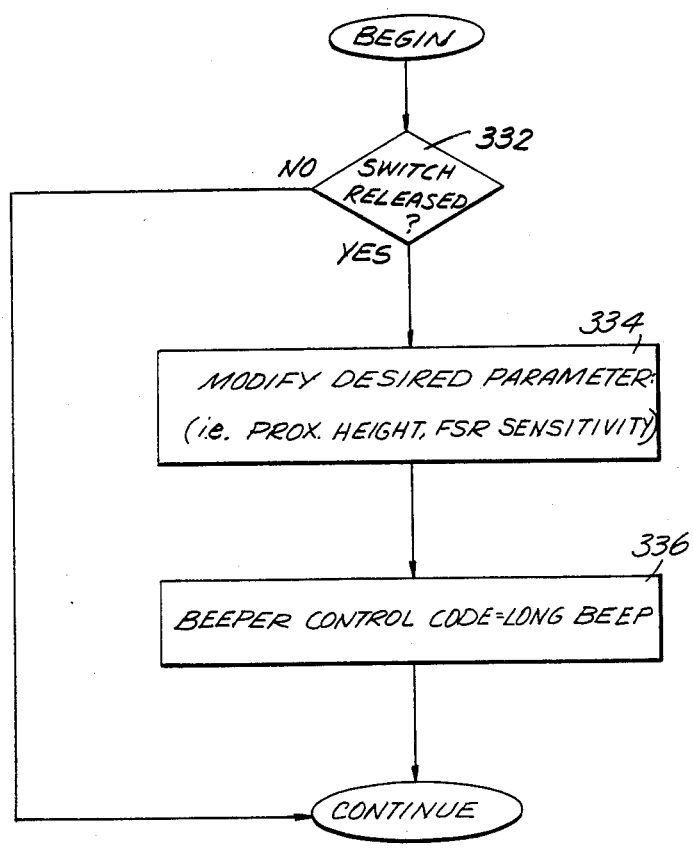
FIG. 10 is a flowchart of the menu routine incorporated in the charge ratio tablet menu program in accordance with the invention.

The flow diagram for each menu subroutine of the preferred embodiment is shown in FIG. 10. The desired parameter threshold level is modified only if the stylus pressure is below a predetermined value, i.e. the "switch" is released. The values corresponding to each parameter threshold level are stored in registers and upon the release of the "switch" (block 332) by releasing the pressure being applied by the stylus against the menu spot, the corresponding stored threshold level value is modified by unity (block 334). In order to modify a parameter threshold level value by n units, the stylus would have to be pressed against and then released from the corresponding menu spot n times, each release resulting in a change of unity. A beep is produced (block 336) to indicate to the user that the modification by one unit has been completed.

The foregoing description of the preferred embodiment is presented for illustrative purposes only and is not intended to limit the scope of the invention as defined in the appended claims. Modifications may be readily effected by one having ordinary skill in the art without departing from the spirit and scope of the inventive concept herein disclosed.

What is claimed is:

1. A digitizer comprising:
    a digitizer tablet having a generally planar top surface and first, second and third electrodes lying in a plane substantially parallel to said top surface, said first electrode having a first geometric pattern, said first pattern varying with a first coordinate in a two-coordinate system, said second electrode having a second geometric pattern, said second pattern varying with the second coordinate in said two-coordinate system, and said third electrode having a third geometric pattern and being arranged between said first and second electrodes, said first, second and third electrodes being made of electrically conductive material and lying within a first area;
    a first menu electrode fixedly arranged in said digitizer tablet in a second area outside said first area, having a fourth geometric pattern, and being made of electrically conductive material;
    a coupling means movable on said digitizer tablet top surface, said coupling means including a coupling electrode capable of electrostatic coupling with said first, second and third electrodes and with said menu electrode; and
    signal generating means for outputting a predetermined driving electrical signal to at least one of said first, second, and third electrodes during each of a plurality of driving cycles in accordance with a predetermined sequence, application of said predetermined driving signal inducing a signal in said coupling electrode when said coupling electrode is capacitively coupled to a driven electrode, wherein said first, second, third and fourth geometric patterns are configured whereby when said coupling electrode overlies said first area and is positioned for maximal capacitive coupling with said first, second and third electrodes, the signal induced in said coupling electrode in response to the simultaneous supply of respective predetermined driving signals to each of said first, second and third electrodes has a magnitude in a first range, and when said coupling electrode overlies said first menu electrode and is positioned for maximal capacitive coupling therewith, the signal induced in said coupling electrode in response to the supply of said predetermined driving signal to said first menu electrode has a magnitude in a second range, said first and second ranges being mutually exclusive.

2. The digitizer as defined in claim 1, further comprising electronic means for receiving and processing signals induced in said coupling electrode in response to said driving signals, said electronic means comprising first means for determining the first and second coordinates of a point on said coupling means relative to said tablet when the magnitude of the signal induced in said coupling electrode is in said first range and second means for performing an operation other than coordinate determination when the magnitude of the signal induced in said coupling electrode is in said second range.

3. The digitizer as defined in claim 1, wherein said first electrode is of the wedge type, said second electrode is of the strip type, and said third electrode is serpentinely arranged and substantially filling the spaces between said first and second electrodes, except that said third electrode is separated from said first and second electrodes by spacing means comprising insulating material.

4. The digitizer as defined in claim 1, wherein said coupling means comprises a cursor.

5. The digitizer as defined in claim 1, wherein said coupling means comprises a stylus.

6. The digitizer as defined in claim 1, wherein said first menu electrode comprises a plate, said plate being electrically connected to a bus.

7. The digitizer as defined in claim 1, wherein said first menu electrode comprises a plurality of fingers, said plurality of fingers being electrically connected to a bus.

8. The digitizer as defined in claim 1, wherein said first electrode and said first menu electrode are electrically connected to said signal generating means by way of a junction means.

9. The digitizer as defined in claim 8, wherein said junction means comprises a plate of electrically conductive material.

10. The digitizer as defined in claim 1, wherein said second electrode and said first menu electrode are electrically connected to said signal generating means by way of a junction means.

11. The digitizer as defined in claim 10, wherein said junction means comprises a plate of electrically conductive material.

12. The digitizer as defined in claim 1, further comprising second and third menu electrodes fixedly arranged in said second area, electrically connected to said signal generating means, and made of electrically conductive material, wherein said second and third menu electrodes have said fourth geometric pattern.

13. The digitizer as defined in claim 12, wherein said first, second and third electrodes respectively and said first, second and third menu electrodes respectively are electrically connected to said signal generating means by way of first, second and third junction means respectively.

14. The digitizer as defined in claim 12, further comprising fourth, fifth and sixth menu electrodes fixedly arranged in said second area, electrically connected to said signal generating means, made of electrically conductive material, and having a fifth geometric pattern, wherein said fifth geometric pattern is configured whereby when said coupling electrode respectively overlies said fourth, fifth or sixth menu electrode and is positioned for maximal capacitive coupling therewith, the signal induced in said coupling electrode in response to the supply of said predetermined driving signal to said fourth, fifth or sixth menu electrode respectively has a magnitude in a third range, said first and third ranges being mutually exclusive.

15. The digitizer as defined in claim 14 wherein said first, second and third electrodes respectively, said first, second and third menu electrodes respectively, and said fourth, fifth and sixth menu electrodes respectively are electrically connected to said signal generating means by way of first, second and third junction means respectively.

16. The digitizer as defined in claim 15, wherein said fourth geometric pattern is a rectangular plate and said fifth geometric pattern is a plurality of parallel bars.

17. A digitizer tablet having a generally planar top surface, an electrode arrangement lying in a plane substantially parallel to said top surface, and a layer of insulating material between said top surface and said electrode arrangement, said electrode arrangement comprising first, second and third patterned electrodes arranged in a first area, first, second and third menu electrodes arranged in a second area, and first, second and third junction electrodes arranged in a third area, said first, second and third areas not overlapping, said first patterned electrode, said first menu electrode and said first junction electrode being electrically connected to form a first circuit, said second patterned electrode, said second menu electrode and said second junction electrode being electrically connected to form a second circuit and said third patterned electrode, said third menu electrode and third junction electrode being electrically connected to form a third circuit, said first patterned electrode having a first geometric pattern, said first pattern varying with a first coordinate in a two-coordinate system, said second patterned electrode having a second geometric pattern, said second pattern varying with a second coordinate in said two-coordinate system, said third patterned electrode having a third geometric pattern, being arranged between said first and second electrodes, and being separated from said first and second patterned electrodes by spacing means comprising insulating material, and said first, second and third menu electrodes each having a fourth geometric pattern.

18. The digitizer tablet as defined in claim 17, further comprising fourth, fifth and sixth menu electrodes arranged in said second area and respectively electrically connected to said first, second and third circuits, each of said fourth, fifth and sixth menu electrodes each having a fifth geometric pattern.

19. The digitizer tablet as defined in claim 17, further comprising first, second and third signal generating means respectively connected to said first, second and third junction electrodes, each of said first, second and third signal generating means being capable of outputting a predetermined driving signal to each of said circuits.

20. A digitizing arrangement comprising:
a digitizer tablet comprising means for producing a first electrostatic field having a characteristic which varies in a first range along a first coordinate direction and means for producing a second electrostatic field having a characteristic which varies in a second range along a second coordinate direction, and means for producing a third electrostatic field having a characteristic which varies along said first and second coordinate directions such that the sum of said characteristic of said first electrostatic, said characteristic of said second electrostatic field and said characteristic of said third electrostatic field has a value in a third range, said third range lying entirely outside of said first and second ranges, said means for producing said first, second and third electrostatic fields being located in a first area of a plane substantially parallel to a top surface of said tablet, and further comprising means for producing a fourth electrostatic field located in a second area of said plane, said fourth electrostatic field having a characteristic the value of which lies outside said third range.

21. A digitizing arrangement comprising:
(a) first electrode means fixedly arranged in a first area of a plane for producing electrostatic forces which vary in first and second coordinate directions in response to receipt of driving signals;
(b) second electrode means fixedly arranged in a second area of said plane for producing electrostatic forces in response to receipt of said driving signals;
(c) signal generating means electrically connected to said first and second electrode means for outputting said driving signals thereto;
(d) coupling means movable relative to said first and second electrode means and capable of producing induced output signals in response to receipt of said driving signal by said first and second electrode means when said coupling means is capacitively coupled thereto; and
(e) processing means electrically connected to receive said induced output signals from said coupling means, said processing means comprising first means for processing said induced output signals in accordance with a first routine in response to said coupling means having at least a predetermined threshold level of capacitive coupling with said first electrode means and second means for processing said induced output signals in accordance with a second routine in response to said coupling means having less than said predetermined threshold level of capacitive coupling with said first electrode means.

22. The digitizing arrangement as defined in claim 21, wherein said second electrode means comprises a plurality of electrodes and said second means for processing said induced output signals comprises means for discriminating which one of said plurality of electrodes said coupling means is capacitively coupled to in response to said coupling means having less than said predetermined threshold level of capacitive coupling with said first electrode means.

23. The digitizing arrangement as defined in claim 2, wherein said second means of said electronic means comprises means for changing a stored value by a predetermined amount.

24. The digitizing arrangement as defined in claim 23, wherein said stored value represents a stylus proximity threshold level.

25. The digitizing arrangement as defined in claim 23, wherein said stored value represents a stylus pressure threshold level.

* * * * *

UNITED STATES PATENT AND TRADEMARK OFFICE
CERTIFICATE OF CORRECTION

PATENT NO. : 4,788,386

DATED : November 29, 1988

INVENTOR(S) : Henry G. Matthews et al.

It is certified that error appears in the above-identified patent and that said Letters Patent is hereby corrected as shown below:

Column 4, line 3, change "simple" to --simply--.

Column 7, line 10, change "pressurebeing" to --pressure being--.

Column 7, line 11, change "th" to --the--.

Signed and Sealed this

Thirteenth Day of October, 1992

Attest:

DOUGLAS B. COMER

*Attesting Officer*         *Acting Commissioner of Patents and Trademarks*